United States Patent
Fischbach et al.

(10) Patent No.: US 10,917,382 B2
(45) Date of Patent: Feb. 9, 2021

(54) VIRTUAL POINT OF PRESENCE IN A COUNTRY TO ALLOW FOR LOCAL WEB CONTENT

(71) Applicant: Forcepoint, LLC, Austin, TX (US)

(72) Inventors: Nicolas Fischbach, Uitikon (CH); Paul Burrows, Cardigan (GB); David Wickham, Reading (GB)

(73) Assignee: Forcepoint, LLC, Austin, TX (US)

( * ) Notice: Subject to any disclaimer, the term of this patent is extended or adjusted under 35 U.S.C. 154(b) by 0 days.

(21) Appl. No.: 16/374,210

(22) Filed: Apr. 3, 2019

(65) Prior Publication Data

US 2020/0322309 A1    Oct. 8, 2020

(51) Int. Cl.
*G06F 15/16* (2006.01)
*H04L 29/12* (2006.01)
*H04L 29/06* (2006.01)
*H04L 29/08* (2006.01)

(52) U.S. Cl.
CPC ........ *H04L 61/609* (2013.01); *H04L 61/2061* (2013.01); *H04L 61/6095* (2013.01); *H04L 67/28* (2013.01); *H04L 69/22* (2013.01)

(58) Field of Classification Search
CPC ............... H04L 61/609; H04L 61/2061; H04L 61/6095; H04L 67/28; H04L 69/22
USPC ........................................................ 709/245
See application file for complete search history.

(56) References Cited

U.S. PATENT DOCUMENTS

| | | | |
|---|---|---|---|
| 7,249,369 B2 | 7/2007 | Knouse et al. | |
| 7,558,775 B1 * | 7/2009 | Panigrahy | H04L 45/00 |
| 7,916,702 B2 * | 3/2011 | Hirano | H04W 8/04 |
| | | | 370/338 |
| 7,941,484 B2 * | 5/2011 | Chandler | H04L 43/0817 |
| | | | 709/204 |
| 7,965,830 B2 * | 6/2011 | Fleck | H04Q 3/005 |
| | | | 379/221.13 |
| 8,060,904 B1 | 11/2011 | Evans et al. | |
| 8,347,392 B2 | 1/2013 | Chess et al. | |
| 8,432,914 B2 * | 4/2013 | Zinjuwadia | H04L 45/04 |
| | | | 370/392 |
| 8,463,612 B1 | 6/2013 | Neath et al. | |
| 8,695,090 B2 | 4/2014 | Barile et al. | |
| 8,856,869 B1 | 10/2014 | Brinskelle | |
| 9,183,258 B1 * | 11/2015 | Taylor | G06F 16/9535 |

(Continued)

OTHER PUBLICATIONS

Baker, F. "Requirements for IP Version 4 Routers," RFC 1812, Jun. 1995. (Year: 1995).*

(Continued)

*Primary Examiner* — Melvin H Pollack
(74) *Attorney, Agent, or Firm* — Terrile, Cannatti & Chambers; Stephen A. Terrile

(57) ABSTRACT

A method, system and computer-usable medium are disclosed for establishing a virtual point of presence or VPoP in a country or locale by registering an internet protocol (IP) prefix range for communication specific to the locale in a physical data center; implementing proxy servers on the data center that support the IP prefix range; geolocating users in the locale to the IP prefix range; network address translating inbound connections to the IP prefix range with IP addresses on the proxy servers to provide extended IP network addresses; and providing content to the users by the proxy servers on using the extended IP network addresses.

20 Claims, 7 Drawing Sheets

(56) References Cited

U.S. PATENT DOCUMENTS

| | | | |
|---|---|---|---|
| 9,197,601 B2* | 11/2015 | Pasdar | H04L 63/0209 |
| 9,208,316 B1* | 12/2015 | Hill | G06F 21/566 |
| 9,219,752 B2 | 12/2015 | Balinsky et al. | |
| 9,363,164 B2* | 6/2016 | Lemieux | H04W 40/20 |
| 9,367,872 B1* | 6/2016 | Visbal | G06F 3/0482 |
| 9,374,228 B2* | 6/2016 | Pendarakis | H04L 9/3247 |
| 9,380,523 B1* | 6/2016 | Mijar | H04W 48/18 |
| 9,419,855 B2* | 8/2016 | Ganichev | H04L 49/35 |
| 9,465,668 B1 | 10/2016 | Roskind et al. | |
| 9,491,183 B1* | 11/2016 | Dippenaar | H04L 63/107 |
| 9,525,838 B2* | 12/2016 | Thiyagarajan | H04N 5/4403 |
| 9,826,023 B2 | 11/2017 | Yu | |
| 9,847,910 B2* | 12/2017 | Chung | H04L 49/70 |
| 10,057,157 B2* | 8/2018 | Goliya | H04L 45/586 |
| 10,063,419 B2* | 8/2018 | Horstmann | H04L 67/1021 |
| 10,122,632 B2* | 11/2018 | Trossen | H04L 45/741 |
| 10,142,353 B2* | 11/2018 | Yadav | H04L 43/04 |
| 10,142,427 B2* | 11/2018 | Li | H04L 41/0803 |
| 10,176,341 B2* | 1/2019 | Spaulding | H04L 67/06 |
| 10,187,485 B1* | 1/2019 | Shavell | H04L 67/327 |
| 10,192,074 B2 | 1/2019 | Sarin et al. | |
| 10,205,663 B1* | 2/2019 | Jones | H04L 45/745 |
| 10,237,175 B2* | 3/2019 | Pignataro | H04L 45/507 |
| 10,255,445 B1 | 4/2019 | Brinskelle | |
| 10,270,878 B1* | 4/2019 | Uppal | H04L 67/2842 |
| 10,284,578 B2* | 5/2019 | Brugger | H04L 63/1416 |
| 10,284,595 B2* | 5/2019 | Reddy | H04L 63/1466 |
| 10,289,857 B1 | 5/2019 | Brinskelle | |
| 10,291,417 B2* | 5/2019 | Vucina | G06Q 20/20 |
| 10,296,558 B1* | 5/2019 | McInerny | G06F 40/131 |
| 10,305,776 B2* | 5/2019 | Horn | H04L 41/0873 |
| 10,326,735 B2 | 6/2019 | Jakobsson et al. | |
| 10,331,769 B1* | 6/2019 | Hill | G06F 40/134 |
| 10,348,639 B2* | 7/2019 | Puchala | H04L 47/193 |
| 10,349,304 B2* | 7/2019 | Kim | H04W 40/00 |
| 10,355,973 B2* | 7/2019 | Cicic | H04L 45/122 |
| 10,439,926 B2* | 10/2019 | Horn | H04L 41/14 |
| 10,440,503 B2* | 10/2019 | Tapia | H04W 24/02 |
| 10,498,693 B1* | 12/2019 | Strauss | H04L 61/20 |
| 10,530,697 B2* | 1/2020 | Fourie | H04L 47/2425 |
| 10,599,462 B2* | 3/2020 | Fried-Gintis | G06F 16/27 |
| 10,601,787 B2* | 3/2020 | Pritikin | G06Q 30/018 |
| 10,635,512 B2* | 4/2020 | Pepin | G06F 9/542 |
| 10,652,047 B2* | 5/2020 | Jain | H04L 12/4633 |
| 10,708,125 B1* | 7/2020 | Chen | H04L 12/4641 |
| 2002/0120599 A1 | 8/2002 | Knouse et al. | |
| 2003/0169724 A1 | 9/2003 | Mehta et al. | |
| 2004/0146006 A1 | 7/2004 | Jackson | |
| 2005/0027782 A1 | 2/2005 | Jalan et al. | |
| 2005/0102266 A1 | 5/2005 | Nason et al. | |
| 2005/0105608 A1 | 5/2005 | Coleman et al. | |
| 2005/0207405 A1 | 9/2005 | Dowling | |
| 2006/0018466 A1 | 1/2006 | Adelstein et al. | |
| 2006/0221967 A1* | 10/2006 | Narayan | H04L 63/101 370/392 |
| 2008/0320556 A1 | 12/2008 | Lee et al. | |
| 2009/0175211 A1 | 7/2009 | Jakobsen | |
| 2009/0241197 A1 | 9/2009 | Troyansky | |
| 2009/0296685 A1 | 12/2009 | O'Shea et al. | |
| 2009/0307600 A1 | 12/2009 | Arthur et al. | |
| 2011/0169844 A1 | 7/2011 | Diard et al. | |
| 2012/0324365 A1 | 12/2012 | Momchilov et al. | |
| 2013/0034097 A1 | 2/2013 | Dharmapurikar et al. | |
| 2013/0091214 A1 | 4/2013 | Kellerman et al. | |
| 2013/0120411 A1 | 5/2013 | Swift et al. | |
| 2013/0340029 A1 | 12/2013 | De Armas et al. | |
| 2014/0032759 A1 | 1/2014 | Barton et al. | |
| 2014/0082726 A1 | 3/2014 | Dreller et al. | |
| 2014/0109174 A1 | 4/2014 | Barton et al. | |
| 2014/0146062 A1 | 5/2014 | Kiel et al. | |
| 2014/0165137 A1 | 6/2014 | Balinsky et al. | |
| 2014/0207850 A1 | 7/2014 | Bestler et al. | |
| 2014/0237594 A1 | 8/2014 | Thakadu et al. | |
| 2014/0280517 A1 | 9/2014 | White et al. | |
| 2014/0379812 A1 | 12/2014 | Bastide, II et al. | |
| 2015/0067832 A1 | 3/2015 | Sastry | |
| 2015/0134730 A1* | 5/2015 | Seedorf | H04L 67/42 709/203 |
| 2015/0220707 A1 | 8/2015 | Kline et al. | |
| 2015/0264035 A1 | 9/2015 | Waterhouse et al. | |
| 2015/0264049 A1 | 9/2015 | Achilles et al. | |
| 2015/0288714 A1 | 10/2015 | Emigh et al. | |
| 2015/0381641 A1* | 12/2015 | Cabrera | H04L 63/1425 726/23 |
| 2016/0080397 A1 | 3/2016 | Bacastow et al. | |
| 2016/0094645 A1* | 3/2016 | Ashutosh | H04L 67/1036 709/226 |
| 2016/0103992 A1 | 4/2016 | Roundy et al. | |
| 2016/0212012 A1* | 7/2016 | Young | G06F 9/45558 |
| 2016/0352719 A1 | 12/2016 | Yu | |
| 2016/0378409 A1 | 12/2016 | Muramatsu | |
| 2017/0061345 A1 | 3/2017 | Jones, III et al. | |
| 2017/0126587 A1 | 5/2017 | Ranns et al. | |
| 2017/0126718 A1 | 5/2017 | Baradaran et al. | |
| 2017/0134506 A1 | 5/2017 | Rotem et al. | |
| 2017/0237779 A1 | 8/2017 | Seetharaman et al. | |
| 2017/0264628 A1 | 9/2017 | Treat et al. | |
| 2017/0302665 A1 | 10/2017 | Zou et al. | |
| 2018/0012144 A1 | 1/2018 | Ding et al. | |
| 2018/0115613 A1 | 4/2018 | Vajravel et al. | |
| 2018/0152471 A1 | 5/2018 | Jakobsson | |
| 2018/0165463 A1 | 6/2018 | McCreary et al. | |
| 2018/0173453 A1 | 6/2018 | Danilov et al. | |
| 2018/0234368 A1 | 8/2018 | Everton | |
| 2018/0330257 A1 | 11/2018 | Dodson et al. | |
| 2018/0375760 A1* | 12/2018 | Saavedra | H04L 12/4633 |
| 2019/0037029 A1 | 1/2019 | Border | |
| 2019/0057200 A1 | 2/2019 | Sabag et al. | |
| 2019/0075124 A1 | 3/2019 | Kimhi et al. | |
| 2019/0182213 A1* | 6/2019 | Saavedra | H04L 63/0218 |
| 2019/0199745 A1 | 6/2019 | Jakobsson et al. | |
| 2019/0268381 A1 | 8/2019 | Narayanaswamy et al. | |
| 2019/0278760 A1* | 9/2019 | Smart | G06F 16/9024 |
| 2019/0342313 A1 | 11/2019 | Watkiss et al. | |
| 2019/0354709 A1 | 11/2019 | Brinskelle | |
| 2019/0378102 A1* | 12/2019 | Kohli | G06F 9/547 |
| 2020/0007548 A1* | 1/2020 | Sanghavi | H04L 61/256 |
| 2020/0021515 A1* | 1/2020 | Michael | H04L 41/12 |
| 2020/0021684 A1 | 1/2020 | Kreet et al. | |
| 2020/0196092 A1* | 6/2020 | Jones | G08B 25/08 |
| 2020/0213336 A1 | 7/2020 | Yu et al. | |
| 2020/0314002 A1* | 10/2020 | Benoist | H04L 45/74 |
| 2020/0314004 A1* | 10/2020 | Rashad | H04L 41/0668 |

OTHER PUBLICATIONS

Nichols, K. et al. "Definition of the Differentiated Services Field (DS field) in the IPv4 and IPv6 Headers," RFC 2474, Dec. 1998. (Year: 1998).*

Fuller and Li. "Classless Inter-Domain Routing (CIDR): The Internet Address Assignment and Aggregation Plan," RFC 4632, Aug. 2006. (Year: 2006).*

Hinden, R., ed. "Applicability Statement for the Implementation of Classless Inter-Domain Routing (CIDR)," RFC 1517, Internet Engineering Steering Group, Sep. 1993. (Year: 1993).*

Grossman, D. "New Terminology and Clarifications for Diffserv," RFC 3260, Apr. 2002. (Year: 2002).*

Arkko, J. et al. "IPv4 Address Blocks Reserved for Documentation," RFC 5737, Jan. 2010. (Year: 2010).*

Cotton, M. et al. "Special Purpose IP Address Registries," RFC 6890, Apr. 2013. (Year: 2013).*

Housley, R et al. "The Internet Numbers Registry System," RFC 7020, Aug. 2013. (Year: 2013).*

Zscaler, About Virtual ZENs, downloaded Apr. 4, 2019.

Check Point Software Technologies Ltd., Firewall and SmartDefense, Version NGX R62, 702048, Sep. 25, 2006.

Check Point Software Technologies Ltd., Softwareblades, Firewall R75.40, Administration Guide, Nov. 30, 2014.

Fortinet, FortiOS Handbook—Firewall, version 5.2.0, May 5, 2017.

Wikipedia, IP Address Spoofing, printed Aug. 16, 2017.

(56) References Cited

OTHER PUBLICATIONS

David Davis, Techrepublic, Prevent IP Spoofing with the Cisco IOS, Mar. 14, 2007.
Evostream.com, Media Server and Video Streaming Software, https://evostream.com/#, printed Feb. 22, 2018.
Wowza.com, Wowza Streaming Engine, https://www.wowza.com/products/streaming-engine, printed Feb. 22, 2018.
Opencv.org, https://opencv.org/, printed Mar. 6, 2018.
Stackoverflow.com, OpenCV Crop Live Feed from Camera, https://stackoverflow.com/questions/17352420/opencv-crop-live-feed-from-camera, printed Feb. 22, 2018.
Mybluelinux.com, What is email envelope and email header, downloaded Jan. 16, 2020.
Papadopoulos et al., An error control scheme for large-scale multicast applications, Proceedings, IEEE INFOCOM '98, the Conference on Computer Communications; Mar. 29-Apr. 2, 1998.
Schmidt et al., AuthoCast: a protocol for mobile multicast sender authentication, Proceeding, MoMM '08 Proceedings of the 6th International Conference on Advanced in Mobile Computing and Multimedia, pp. 142-149, 2008.

\* cited by examiner

US 10,917,382 B2

VIRTUAL POINT OF PRESENCE IN A COUNTRY TO ALLOW FOR LOCAL WEB CONTENT

BACKGROUND OF THE INVENTION

Field of the Invention

The present invention relates in general to the field of computers and similar technologies, and in particular to software utilized in this field. Still more particularly, it relates to a method, system and computer-usable medium for providing a virtual point of presence in a country to allow for local web content.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

Content can be provided to users from various sources, including the World Wide Web, Internet, and various data repositories. In many instances, there is a critical need to protect the use or spread of such content. Concerns arise as to potential actions of users as discussed above. In certain cases, content can be provided by physical data centers. Such data centers can be physically located in a particular city of a particular country. The data centers provide content in the local language. Data centers allow providers to maintain a point of presence in different countries/locales. If there is a desire to provide content through a data center in a different or new country/locale, where such content is a different language, a data center is set up and maintained in that country/locale; however, to set up and maintain such physical data centers involves a significant investment in resources.

SUMMARY OF THE INVENTION

A method, system and computer-usable medium are disclosed for establishing a virtual point of presence or VPoP in a country or locale by registering an internet protocol (IP) prefix range for communication specific to the locale in a physical data center; implementing proxy servers on the data center that support the IP prefix range; geolocating users in the locale to the IP prefix range; network address translating inbound connections to the IP prefix range with IP addresses on the proxy servers to provide extended IP network addresses; and providing content to the users by the proxy servers on using the extended IP network addresses.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
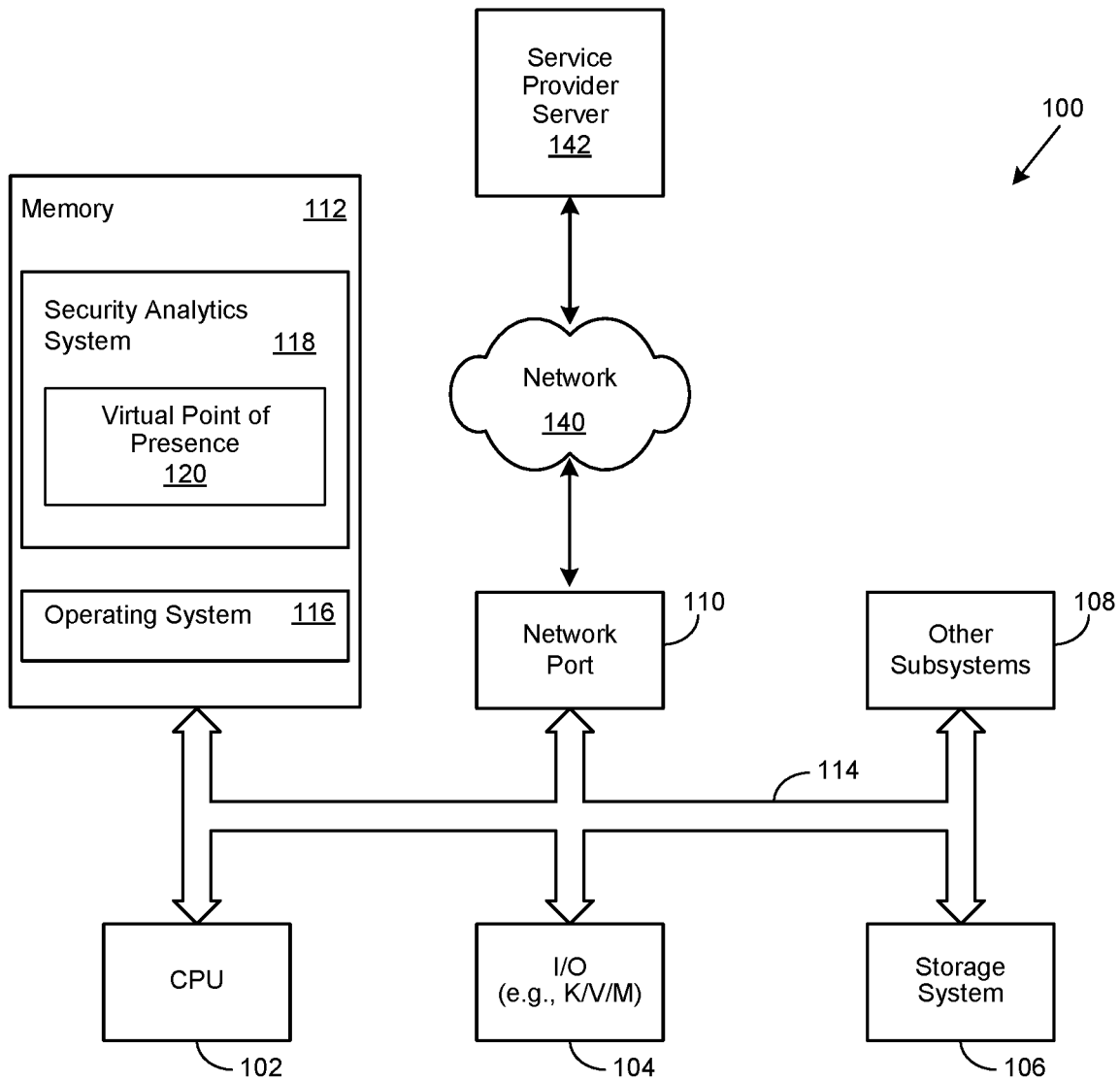
FIG. 1 is a generalized illustration of an information handling system.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a keyboard, video (display), a mouse, and associated controllers (e.g., K/V/M), a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to monitor user content usage. In certain embodiments, the security analytics system 118 may include a virtual point of presence (VPOP) 120 that supports a particular country/locale, providing content in the local language of the country or locale. In certain implementations, other VPOPs are provided for other countries and locales.

Figure 2:
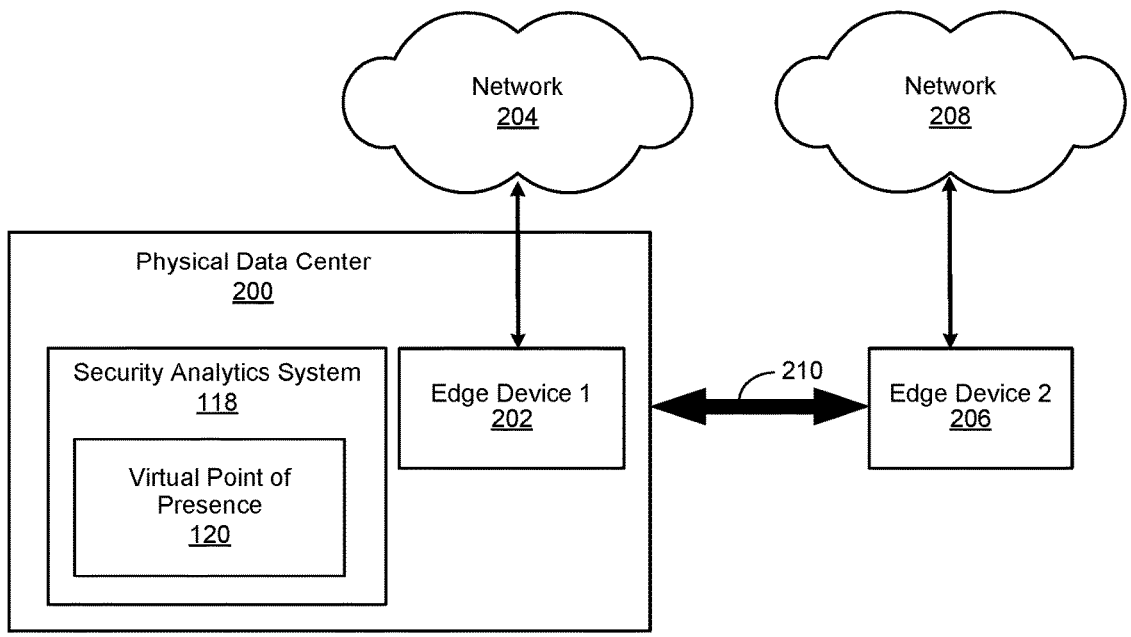
FIG. 2 is a generalized illustration of a data center.

FIG. 2 is a generalized illustration of a data center that can be used to implement the system and method of the present invention. In certain embodiments, a physical data center 200 is an information handling system 100 as described above. It is to be understood that physical data center can include multiple computers, such as server computers. In certain implementations, the physical data center 200 resides in a particular country/locale, and specifically a city. For certain implementations, the physical data center 200 is configured to support the locale language of that country/locale. For example, if physical data center 200 is located in Paris, France, the physical data center would support French, and provide local content in French.

In certain implementations, the physical data center 200 includes an edge device 1 202. Edge device 1 202 can be implemented as a router, and in particular a border gateway protocol (BGP) router. Implementations of edge device 1 202 are further described below in reference to FIG. 3. The edge device 1 202 can connect to a network 204. In certain implementations, network 204 includes or is included in network 140. Continuing the scenario of data center 200 being located in Paris, information and content from edge device 1 202 is performed in the locale language, French. French specific content is sent and received from edge device 1 202 to and from network 204. For example, advertising or messages from edge device 1 202 to network 204 are in French.

In certain implementations, an edge device 2 206 is provided for a different country/locale. For example, edge device 2 206 is provided for Madrid, Spain. Edge device 2 206 may also be a router, and in particular a BGP router. Edge device 2 206 can be connected to a network 208. In certain implementations, network 208 includes or is included in network 140. Information and content from edge device 2 206 is performed in the locale language, Spanish. Spanish specific content is sent and received from edge device 2 206 to and from network 208. For example, advertising or messages from edge device 1 202 to network 204 are in Spanish.

In certain implementations, the edge device 2 206 is connected to the physical data center 200 through an Internet backbone 210, such as 10 gigabit BGP backbone, which can include various circuit(s). In certain embodiments, VPOP 120 is configured to support edge device 2 206, allowing edge device 2 206 to receive and provide locale Spanish content in Madrid. In certain embodiments, the VPOP 120 will include a virtual cluster of server computers (servers), such as proxy servers (proxies). The virtual cluster of servers support the Spanish content in Madrid and establish the virtual point of presence in Madrid.

Using the physical data center 200 in Paris, users in Spain (Madrid) can receive and provide local Spanish content. In certain implementations, an Internet Protocol (IP) address prefix range (e.g., /24 subnet) is registered in the Spain, which is considered the target country. That prefix range can be provided or announced from the data center 200 in Paris, for example through routers (e.g., edge device 1 202). In certain implementations, proxy servers in the virtual cluster of servers (which support the Spanish virtual point of presence) will have the additional prefix range (i.e., extended IP address that includes French IP address and additional Spanish prefix range). Spanish users will then be geolocated to this extended IP address. In certain implementations, using network address translation (NAT), inbound connections to the Spanish prefix will be NATed to routers (e.g., edge device 1 202) to extended IP addresses on proxy servers of the virtual cluster of servers. For example, the proxy servers will memorize which interface that the communication arrived on and forward the request to the same IP address to fetch content, such as content from network 208. Through the implementation of security analytics 118, as further discussed below, secure content exchange as well as a virtual point of presence can be provided to the target country or locale (i.e., Spain/Madrid). Therefore, for certain implementations, a point of contact is established for a Spanish virtual cluster in the Paris physical data center 200, by providing additional IP ranges for Spanish users. The IP ranges representing the Spanish virtual cluster. Enforcement takes place at the Paris physical data center.

In certain implementations in providing a VPoP, proxy servers implement code to tag proxy and web connections. This can be implemented by providing predefined Differentiated Services Code Point (DSCP) headers that can be used by a firewall/NAT device to select an outgoing IP range. The DSCP value choice can be controlled by user' policies. The following is an example scenario: a proxy server in Cluster-D receives a connection from User A; the proxy server matches policy "Users in Spain" based on the connection IP; policy "Users in Spain" looks up the IP header mapping for supported countries in cluster D; the proxy server finds "country "ES" and the IP DSCP tag "1"; the proxy opens a socket with IP DSCP value 1; and the NAT device (currently FWL) matches the DSCP value and assigns a predefined external VIP for outgoing connection to web.

In another implementation providing a VPoP, separate virtual local area network (VLAN) is provided. The same proxy servers are implemented; however, a virtual firewall with a separate VLAN are provided. The VPoP 120 and any new VPoPs are added to a domain name service (DNS) system, such as GeoDNS, such that that inbound traffic to the new/added clusters can be controlled the same way as current clusters. For example, if a new VPoP is created for the "Wales" the following scenario can be performed: register /24 IP subnet addresses to Wales; build a 2× cluster firewalls for Wales using Wales /24; announce the IP range to local (e.g. city of Slough, Wales) routers; add an extra IP address to each proxy server in Slough on a VLAN interface; add a routing rule for traffic source from that IP address to uses its default gateway; and add VLAN to switches. For proxy servers, add logic to determine which IP address the traffic came in on and go back out on the same IP address. Announce to get broadcast traffic to source from multiple IP addresses.

In certain embodiments, implementation of providing VPoP, such as use of DSCP headers and VLANs can be combined. For example, implementing a GeoDNS solution and DSCPtage on ingress public IP addresses. In such an implementation, the /24 subnet IP addresses are registered to a country or locale. The /24 subnet IP are announced to the respective routers and a firewall tag and NAT rules applied. The new VPoP is added to the DNS system (GeoDNS). For proxy servers, the DSCP header is read and the same DSCP header is added when fetching content.

In certain implementations, users can access content (i.e., web service) via a domain name service (DNS) system, such as GeoDNS. For example, through the physical data center 200, located in Paris, a lookup from users in Spain (Madrid) is sent to Spanish VPoP IP addresses which are physically located in data center 200. Lookup from users in France (Paris) continue are sent to French data center 200 IP addresses.

In certain implementations, the data center 200 includes a firewall, which is further described below in reference to FIG. 3. In a VPoP configuration, a network namespace is logically a copy of the network stack, with its own routes, firewall rules, and network devices. In an implementation, in a VPoP configuration, a configuration file such as a "yaml" file is provided for each VPoP, such as VPoP 120, on firewalls of a virtual cluster, where the VPoP exists. The configuration or "yaml" file defines the interface and routes for the VPoP 120. An interface can be provided for virtual devices (veth interface) for the firewall to tunnel traffic into the namespace, providing a default route to a VPoP firewall through the VPoP router or edge device 2 206. A NAT rule is provided, such that traffic from the VPoP router or edge device 2 206 is NATed to the main firewall IP, allowing reports of routes to the main cluster. In certain implementations, firewall configuration files or "fwconfigs" files are included in a source directory at the data center 200.

In certain implementations, proxy servers of the virtual cluster of the VPoP 120, can set up with an extra interface to route back to a firewall supporting the VPoP 120. In addition, a file storing data structures and objects, such as a JavaScript Object Notation or JSON file can be provide for IP or country mapping (e.g., to Spain). Such a JSON file may be created by a software configuration management tool, such as "Puppet" software. The software configuration management tool can configure and add an interface to each proxy server. Furthermore, a rule can be added by the software configuration management tool that traffic from VPoP 120 lookups an appropriate routing table. The software configuration management tool can add a default route to the routing table. In addition, the software configuration management tool can source announcements from the VPoP IP address.

Figure 3:
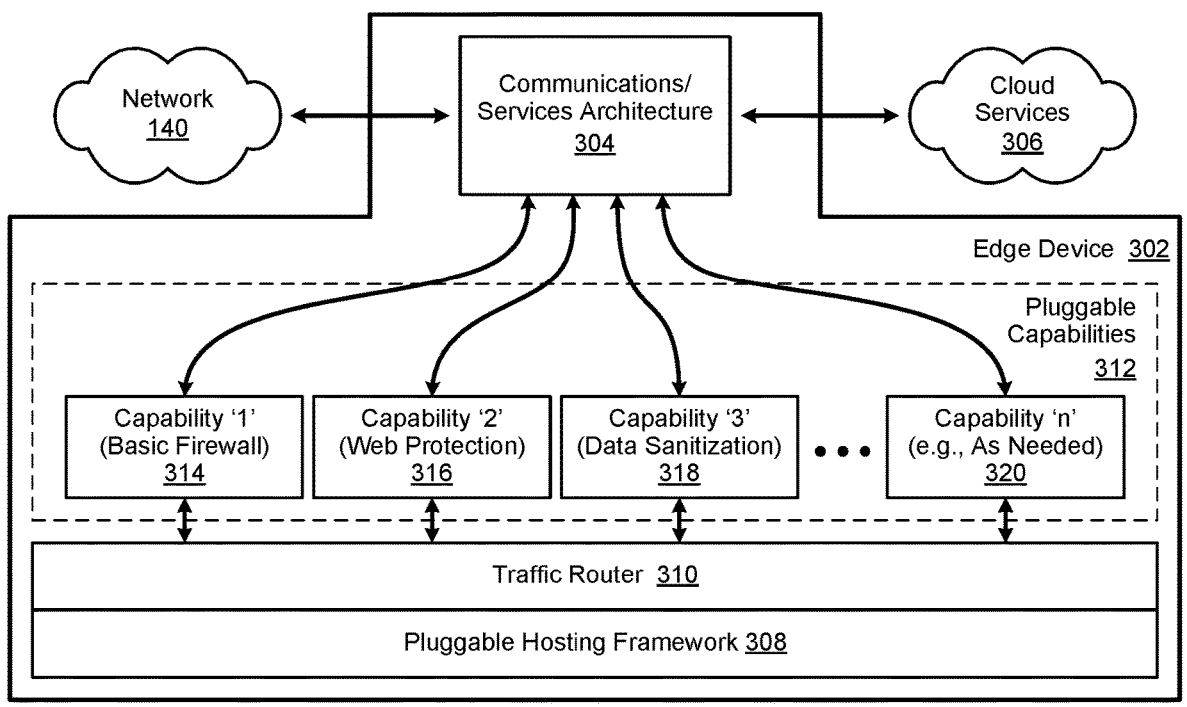
FIG. 3 is a simplified block diagram of an edge device.

FIG. 3 is a simplified block diagram of an edge device implemented in accordance with an embodiment of the invention. As used herein, an edge device, such as the edge device 302 shown in FIG. 3, broadly refers to a device providing an entry point into a network 140, as well as networks 204 and 208 of FIG. 2. Examples of such edge devices 302 may include routers, routing switches, integrated access devices (IADs), multiplexers, wide-area network (WAN) access devices, and network security appliances, such as edge device 1 202 and edge device 2 206. In certain embodiments, the network 140, as well as networks 204 and 208 of FIG. 2, may be a private network (e.g., an enterprise network), a semi-public network (e.g., a service provider core network), or a public network (e.g., the Internet).

Skilled practitioners of the art will be aware that edge devices 302 are often implemented as routers that provide authenticated access to faster, more efficient backbone and core networks. Furthermore, current industry trends include making edge devices 302 more intelligent, which allows core devices to operate at higher speed as they are not burdened with additional administrative overhead. Accordingly, such edge devices 302 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 302 to have redundant links to the core network, which not only provides improved reliability, but enables enhanced, flexible, and scalable security capabilities as well.

In certain embodiments, the edge device 302 may be implemented to include a communications/services architecture 304, various pluggable capabilities 312, a traffic router 310, and a pluggable hosting framework 308. In certain embodiments, the communications/services architecture 302 may be implemented to provide access to and from various networks 140, cloud services 306, or a combination thereof. In certain embodiments, the cloud services 306 may be provided by a cloud infrastructure familiar to those of skill in the art. In certain embodiments, the edge device 302 may be implemented to provide support for a variety of generic services, such as directory integration, logging interfaces, update services, and bidirectional risk/context flows associated with various analytics. In certain embodiments, the edge device 302 may be implemented to provide temporal information, described in greater detail herein, associated with the provision of such services.

In certain embodiments, the edge device 302 may be implemented as a generic device configured to host various network communications, data processing, and security management capabilities. In certain embodiments, the pluggable hosting framework 308 may be implemented to host such capabilities in the form of pluggable capabilities 312. In certain embodiments, the pluggable capabilities 312 may include capability '1' 314 (e.g., basic firewall), capability '2' 316 (e.g., general web protection), capability '3' 318 (e.g., data sanitization), and so forth through capability 'n' 320, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 312 may be sourced from various cloud services 306. In certain embodiments, the pluggable hosting framework 308 may be implemented to provide certain computing and communication infrastructure components, and foundation capabilities, required by one or more of the pluggable capabilities 312. In certain embodiments, the pluggable hosting framework 308 may be implemented to allow the pluggable capabilities 312 to be dynamically invoked. Skilled practitioners of the art will recognize that many such embodiments are possible. Accordingly, the foregoing is not intended to limit the spirit, scope or intent of the invention.

Figure 4:
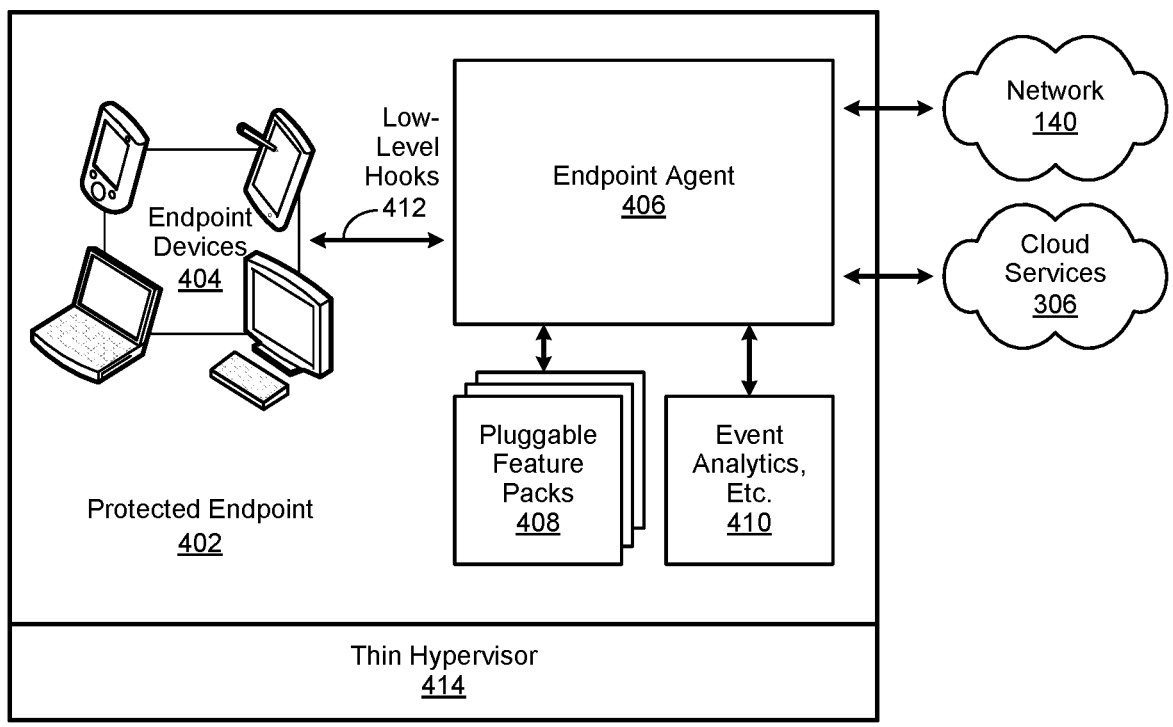
FIG. 4 is a simplified block diagram of an endpoint agent.

FIG. 4 is a simplified block diagram of an endpoint agent implemented in accordance with an embodiment of the invention. As used herein, an endpoint agent 406 broadly refers to a software agent used in combination with an endpoint device 404 to establish a protected endpoint 402. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 404, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 404 when it is offline. In this example, the information may be communicated to its intended recipient once the endpoint device 404 gains access to a network 140.

A protected endpoint 402, as likewise used herein, broadly refers to a policy-based approach to network security that typically requires endpoint devices 404 to comply with particular criteria before they are granted access to network resources. As an example, a given endpoint device 404 may be required to have a particular operating system (OS), or version thereof, a Virtual Private Network (VPN) client, anti-virus software with current updates, and so forth. In certain embodiments, the protected endpoint 402 may be implemented to perform operations associated with providing real-time resolution of the identity of an entity at a particular point in time, as described in greater detail herein. In certain embodiments, the protected endpoint 402 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 404 to access and browse a particular website on the Internet. In this example, the individual actions performed by the user to access and browse the website constitute a cyber behavior. As another example, a user may use an endpoint device 404 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 404, or various resources, described in greater detail herein. In certain embodiments, the entities may include various endpoint devices 404 or resources operating at the behest of an entity, such as a user. In certain embodiments, the communication between the entities may include audio, image, video, text, or binary data.

As described in greater detail herein, the contextual information may include a user's authentication factors 704. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 404, a network 140, a resource, or another user. In certain embodiments, user behaviors, and their related contextual information, may be collected at particular points of observation, and at particular points in time, described in greater detail herein.

In certain embodiments, the endpoint agent 406 may be implemented to universally support a variety of operating systems, such as Apple Macintosh®, Microsoft Windows®, Linux®, Android® and so forth. In certain embodiments, the endpoint agent 406 may be implemented to interact with the endpoint device 404 through the use of low-level hooks 412 at the OS level. It will be appreciated that the use of low-level hooks 412 allows the endpoint agent 406 to subscribe to multiple events through a single hook. Consequently, multiple functionalities provided by the endpoint agent 406 can share a single data stream, using only those portions of the data stream they may individually need. Accordingly, system efficiency can be improved and operational overhead reduced.

In certain embodiments, the endpoint agent 406 may be implemented to provide a common infrastructure for pluggable feature packs 408. In various embodiments, the pluggable feature packs 408 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 408 is invoked as needed by the endpoint agent 406 to provide a given functionality. In certain embodiments, individual features of a particular pluggable feature pack 408 are invoked as needed. It will be appreciated that the ability to invoke individual features of a pluggable feature pack 408, without necessarily invoking all such features, will likely improve the operational efficiency of the endpoint agent 406 while simultaneously reducing operational overhead. Accordingly, the endpoint agent 406 can self-optimize in certain embodiments by using the common infrastructure and invoking only those pluggable components that are applicable or needed for a given user behavior.

In certain embodiments, the individual features of a pluggable feature pack 408 are invoked by the endpoint agent 406 according to the occurrence of a particular user behavior. In certain embodiments, the individual features of a pluggable feature pack 408 are invoked by the endpoint agent 406 according to the occurrence of a particular temporal event, described in greater detail herein. In certain embodiments, the individual features of a pluggable feature pack 408 are invoked by the endpoint agent 406 at a particular point in time. In these embodiments, the method by which a given user behavior, temporal event, or point in time is selected is a matter of design choice.

In certain embodiments, the individual features of a pluggable feature pack 408 may be invoked by the endpoint agent 406 according to the context of a particular user behavior. As an example, the context may be the user enacting the user behavior, their associated risk classification, which resource they may be requesting, the point in time the user behavior is enacted, and so forth. In certain embodiments, the pluggable feature packs 408 may be sourced from various cloud services 306. In certain embodiments, the pluggable feature packs 408 may be dynamically sourced from various cloud services 306 by the endpoint agent 406 on an as-need basis.

In certain embodiments, the endpoint agent 406 may be implemented with additional functionalities, such as event analytics 410. In certain embodiments, the event analytics 410 functionality may include analysis of various user behaviors, described in greater detail herein. In certain embodiments, the endpoint agent 406 may be implemented with a thin hypervisor 414, which can be run at Ring −1, thereby providing protection for the endpoint agent 406 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 5:
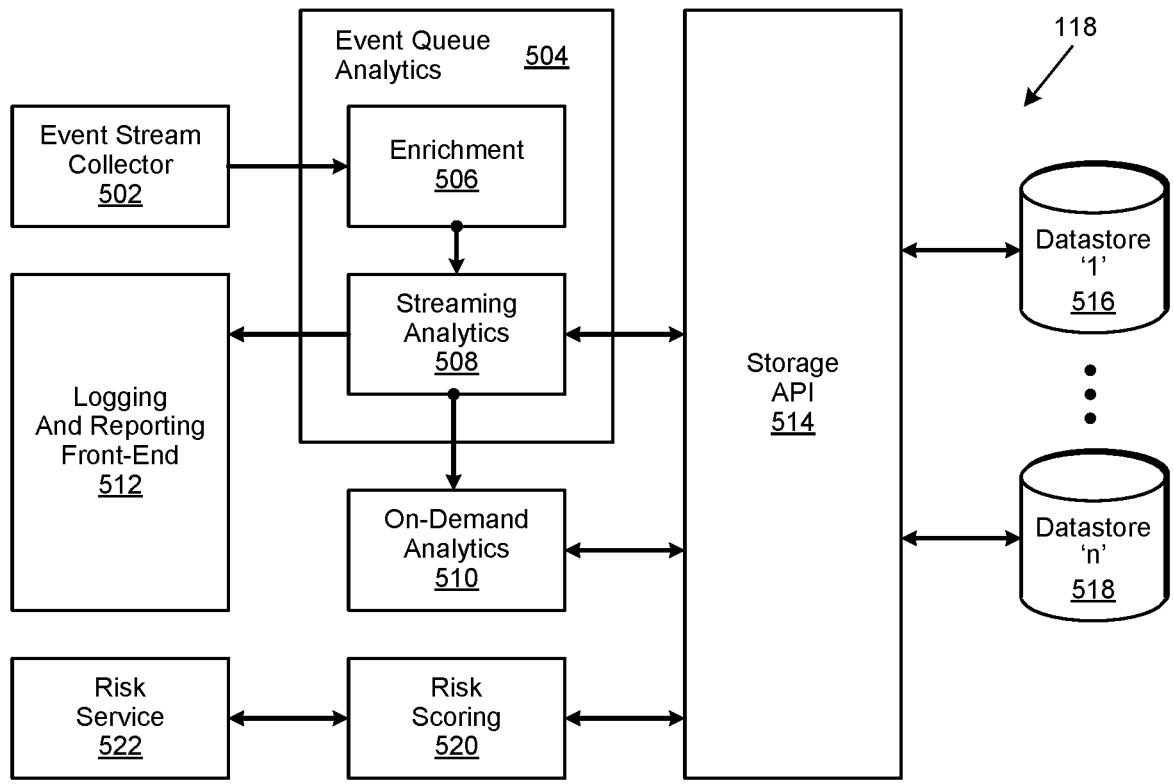
FIG. 5 is a simplified block diagram of a security analytics system.

FIG. 5 is a simplified block diagram of a security analytics system implemented in accordance with an embodiment of the invention. In certain embodiments, the security analytics system 118 shown in FIG. 5 may include an event queue analytics 504 module, described in greater detail herein. In certain embodiments, the event queue analytics 504 subsystem may be implemented to include an enrichment 506 module and a streaming analytics 508 module. In certain embodiments, the security analytics system 118 may be implemented to provide log storage, reporting, and analytics capable of performing streaming 508 and on-demand 510 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 502 may be implemented to collect event and related contextual information, described in greater detail herein, associated with various user behaviors. In these embodiments, the method by which the event and contextual information is selected to be collected by the event stream collector 502 is a matter of design choice. In certain embodiments, the event and contextual information collected by the event stream collector 502 may be processed by an enrichment module 506 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 506 to a streaming 508 analytics module. In turn, the streaming 508 analytics module may provide some or all of the enriched user behavior information to an on-demand 510 analytics module. As used herein, streaming 508 analytics broadly refers to analytics performed in near real-time on enriched user behavior information as it is received. Likewise, on-demand 510 analytics broadly refers herein to analytics performed, as they are requested, on enriched user behavior information after it has been received. In certain embodiments, the enriched user behavior information may be associated with a particular event. In certain embodiments, the enrichment 506 and streaming analytics 508 modules may be implemented to perform event queue analytics 504 operations, as described in greater detail herein.

In certain embodiments, the on-demand 510 analytics may be performed on enriched user behavior associated with a particular interval of, or point in, time. In certain embodiments, the streaming 508 or on-demand 510 analytics may be performed on enriched user behavior associated with a particular user, group of users, one or more entities, or a combination thereof. In certain embodiments, the streaming 508 or on-demand 510 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 508 or on-demand 510 analytics modules may be provided to a storage Application Program Interface (API) 514. In turn, the storage API 512 may be implemented to provide access to various datastores '1' 516 through 'n' 518, which in turn are used to store the results of the analytics operations. In certain embodiments, the security analytics system 118 may be implemented with a logging and reporting front-end 512, which is used to receive the results of analytics operations performed by the streaming 508 analytics module. In certain embodiments, the datastores '1' 516 through 'n' 518 may variously include a datastore of entity identifiers, temporal events, or a combination thereof.

In certain embodiments, the security analytics system 118 may include a risk scoring 520 module implemented to perform risk scoring operations, described in greater detail herein. In certain embodiments, functionalities of the risk scoring 520 module may be provided in the form of a risk management service 522. In certain embodiments, the risk management service 522 may be implemented to perform operations associated with defining and managing a user profile, as described in greater detail herein. In certain embodiments, the risk management service 522 may be implemented to perform operations associated with detecting anomalous, abnormal, unexpected or malicious user behavior and adaptively responding to mitigate risk, as described in greater detail herein. In certain embodiments, the risk management service 522 may be implemented to provide the results of various analytics operations performed by the streaming 506 or on-demand 508 analytics modules. In certain embodiments, the risk management service 522 may be implemented to use the storage API 512 to access various enhanced cyber behavior and analytics information stored on the datastores '1' 514 through 'n' 516. Skilled practitioners of the art will recognize that many such embodiments are possible. Accordingly, the foregoing is not intended to limit the spirit, scope or intent of the invention.

Figure 6:
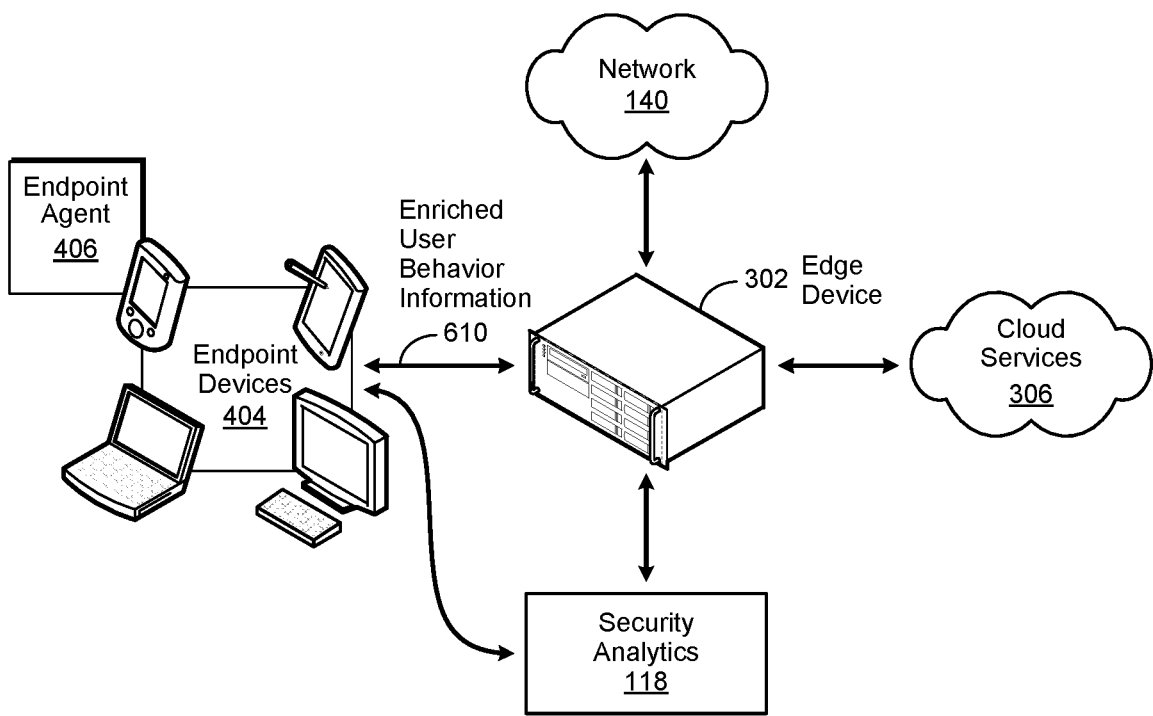
FIG. 6 is a simplified block diagram of a security analytics system.

FIG. 6 is a simplified block diagram of the operation of a security analytics system implemented in accordance with an embodiment of the invention. In certain embodiments, the security analytics system 118 may be implemented to perform operations associated with detecting anomalous, abnormal, unexpected or malicious user behavior, as described in greater detail herein. In certain embodiments, the security analytics system 118 may be implemented in combination with one or more endpoint agents 406, one or more edge devices 302, various cloud services 306, and a network 140 to perform such operations.

In certain embodiments, the network edge device 302 may be implemented in a bridge, a firewall, or a passive monitoring configuration. In certain embodiments, the edge device 302 may be implemented as software running on an information handling system. In certain embodiments, the network edge device 302 may be implemented to provide integrated logging, updating and control. In certain embodiments, the edge device 302 may be implemented to receive network requests and context-sensitive user behavior information in the form of enriched user behavior information 610, described in greater detail herein, from an endpoint agent 406, likewise described in greater detail herein. In certain implementations with a VPoP, where the edge device 302 supporting a target country/locale, the edge device 302 is implemented by security analytics system 118.

In certain embodiments, the security analytics system 118 may be implemented as both a source and a sink of user behavior information. In certain embodiments, the security analytics system 118 may be implemented to serve requests for user/resource risk data. In certain embodiments, the edge device 302 and the endpoint agent 406, individually or in combination, may provide certain user behavior information to the security analytics system 118 using either push or pull approaches familiar to skilled practitioners of the art.

As described in greater detail herein, the edge device 302 may be implemented in certain embodiments to receive enriched user behavior information 610 from the endpoint agent 406. It will be appreciated that such enriched user behavior information 610 will likely not be available for provision to the edge device 302 when an endpoint agent 406 is not implemented for a corresponding endpoint device 304. However, the lack of such enriched user behavior information 510 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 406 attaching contextual information to a request. In certain embodiments, the context is embedded within a network request, which is then provided as enriched user behavior information 610. In certain embodiments, the contextual information may be concatenated, or appended, to a request, which in turn may be provided as enriched user behavior information 610. In these embodiments, the enriched user behavior information 610 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 302. In these embodiments, the new flow requests may be provided as enriched user behavior information 510. In certain embodiments, the endpoint agent 406 may also send updated contextual information to the edge device 302 once it becomes available. As an example, an endpoint agent 406 may share a list of files that have been read by a current process at any point in time once the information has been collected. To continue the example, such a list of files may be used to determine which data the endpoint agent 406 may be attempting to exfiltrate.

In certain embodiments, point analytics processes executing on the edge device 302 may request a particular service. As an example, risk scores associated with a particular event on a per-user basis may be requested. In certain embodiments, the service may be requested from the security analytics system 118. In certain embodiments, the service may be requested from various cloud services 306.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 404. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 302 can then use this information to manage the appropriate response to submitted requests.

In certain embodiments, the security analytics system 118 may be implemented in different operational configurations. In certain embodiments, the security analytics system 118 may be implemented by using the endpoint agent 406. In certain embodiments, the security analytics system 118 may be implemented by using endpoint agent 306 in combination with the edge device 302. In certain embodiments, the cloud services 306 may likewise be implemented for use by the endpoint agent 406, the edge device 302, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 406 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 404. It will be appreciated that such an approach may prove advantageous when an adversary is "moving sideways" through a network environment, using different endpoint devices 404 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 302 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 302 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 406, which allows the quantity and type of information associated with particular hosts to be measured. In turn, this information may be used to determine how the edge device 302 handles requests. By contextualizing such user behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 7A:
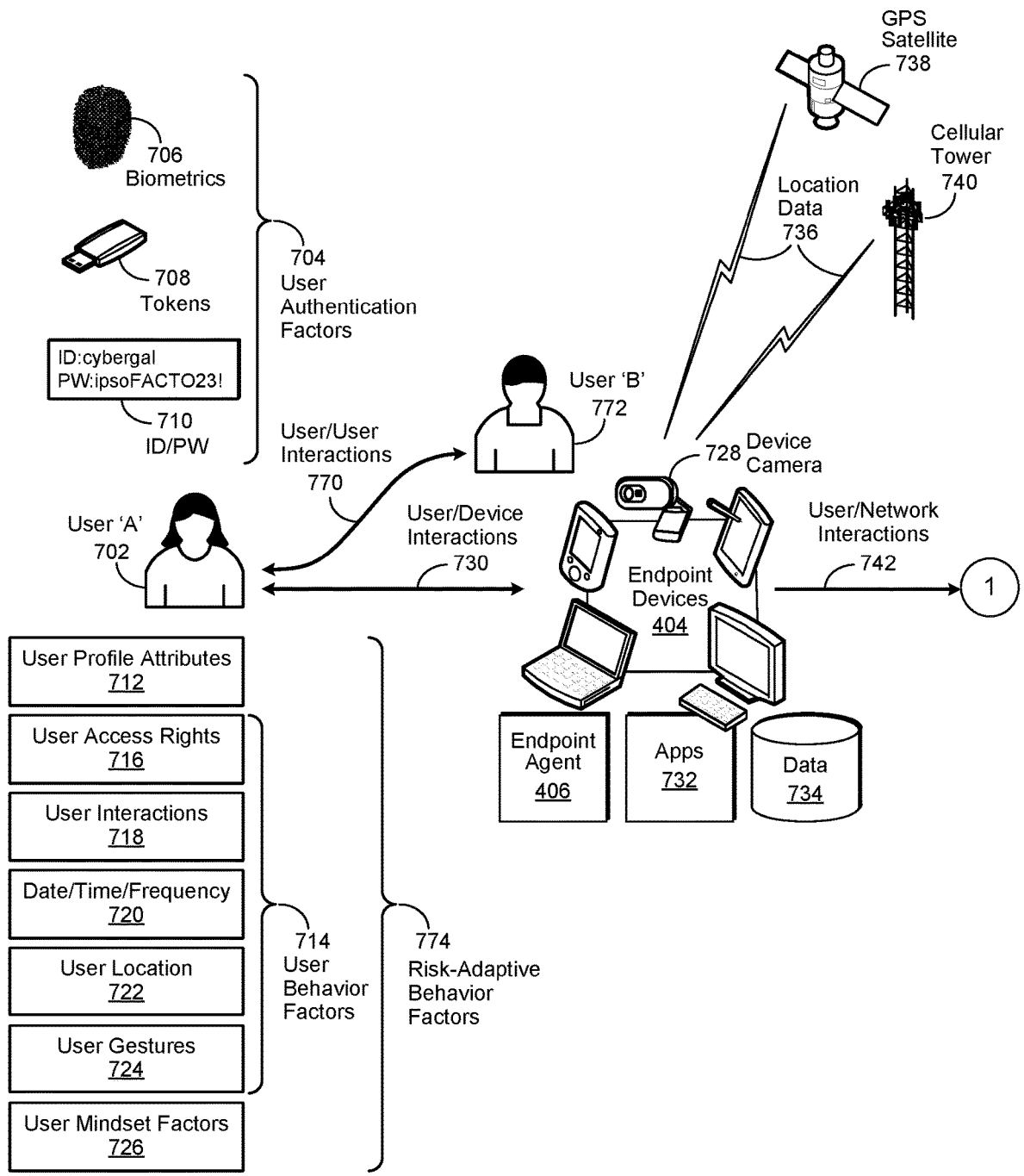
FIGS. 7a and 7b shows a block diagram of a security analytics system environment.
Figure 7B:
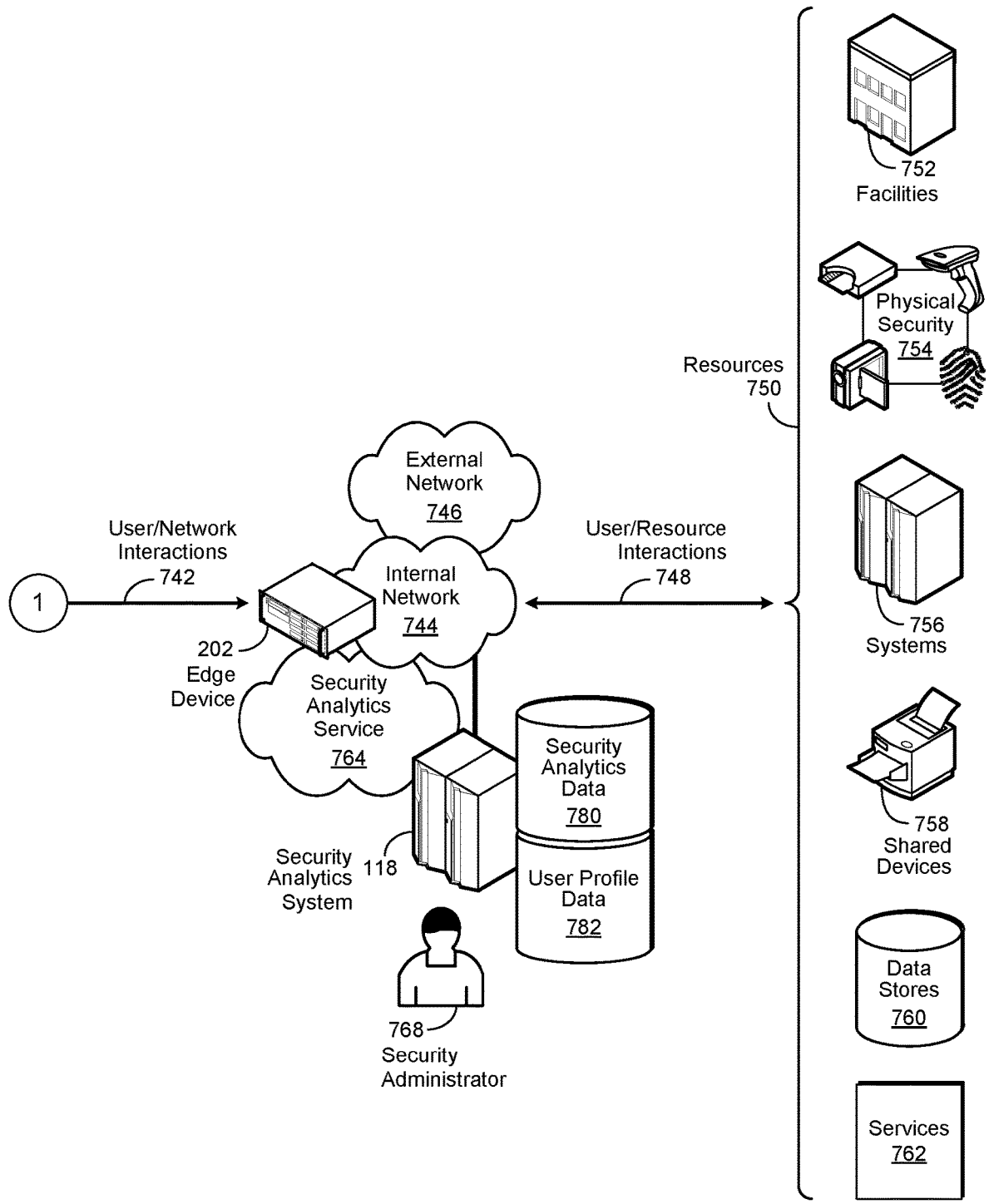

FIGS. 7*a* and 7*b* show a block diagram of a security analytics environment implemented in accordance with an embodiment of the invention. In certain embodiments, analyses performed by a security analytics system 118 may be used to identify anomalous, abnormal, unexpected or malicious behavior associated with an entity. In certain embodiments, the anomalous, abnormal, unexpected or malicious behavior may be identified at a particular point in time, during the occurrence of an event, the enactment of a user behavior, or a combination thereof.

As used herein, an entity broadly refers to something that exists as itself, whether physically or abstractly. In certain embodiments, an entity may be an individual user, a group, an organization, or a government. In certain embodiments, an entity may likewise be an item, a device, such as endpoint 404 and edge devices 302, a network, such as an internal 744 and external 746 networks, a domain, an operation, or a process. In certain embodiments, an entity may be a resource 750, such as a geographical location or formation, a physical facility 752, such as a venue, various physical security devices 754, a system 756, shared devices 758, such as printer, scanner, or copier, a data store 760, or a service 762, such as a service 762 operating in a cloud environment.

As likewise used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

In certain embodiments, information associated with such user behavior may be stored in a user profile. As used herein, a user profile broadly refers to a collection of information that uniquely describes a user's identity and their associated behavior, whether the behavior occurs within a physical realm or cyberspace. In certain embodiments, the user profile may be stored in a repository of user profile data 782. In certain embodiments, as described in greater detail herein, the user profile may include user profile attributes 712, user behavior factors 714, user mindset factors 726, or a combination thereof.

As used herein, a user profile attribute 712 broadly refers to data or metadata that can be used, individually or in combination with other user profile attributes 712, to uniquely ascertain the identity of an entity. In certain embodiments, the user profile attributes 712 may include certain personal information. In certain embodiments, the personal information may include non-sensitive personal information associated with a user, such as their name, title, position, role, and responsibilities. In certain embodiments, the personal information may likewise include technical skill level information, peer information, expense account information, paid time off (PTO) information, data analysis information, insider information, misconfiguration information, third party information, or a combination thereof.

In certain embodiments, the personal information may contain sensitive personal information associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Additional examples of SPI may include government-issued identifiers, such as a Social Security Number (SSN) or a passport number, vehicle registration plate and serial numbers, and driver's license numbers. Other examples of SPI may include certain email addresses and social media identifiers, financial account information, such as credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 704.

In certain embodiments, the user authentication factors 704 may be used to authenticate the identity of a user, such as user 'A' 702 or 'B' 772. In certain embodiments, the user authentication factors 704 may be used to ensure that a particular user, such as user 'A' 702 or 'B' 772, is associated with their corresponding user profile, rather than a user profile associated with another user. In certain embodiments, the user authentication factors 704 may include a user's biometrics 706 (e.g., a fingerprint or retinal scan), tokens 708 (e.g., a dongle containing cryptographic keys), user identifiers and passwords (ID/PW) 710, and personal identification numbers (PINs).

As used herein, user behavior factors 714 broadly refers to information associated with a user's behavior, whether the behavior occurs within a physical realm or cyberspace. In certain embodiments, the user behavior factors 714 may include the user's access rights 716, the user's interactions 718, and the date/time/frequency 720 of those user interactions 718. In certain embodiments, the user behavior factors 714 may likewise include the user's location 722 when the interactions 718 are enacted, and the user gestures 724 used to enact the interactions 718.

In certain embodiments, the user gestures 724 may include key strokes on a keypad, a cursor movement, a mouse movement or click, a finger swipe, tap, or other hand gesture, an eye movement, or some combination thereof. In certain embodiments, the user gestures 724 may likewise include the cadence of the user's keystrokes, the motion, force and duration of a hand or finger gesture, the rapidity and direction of various eye movements, or some combination thereof. In certain embodiments, the user gestures 724 may include various audio or verbal commands performed by the user.

In various embodiments, certain date/time/frequency 720 user behavior factors 714 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 712, user behavior factors 714, user mindset factors 726, or a combination thereof, to one or more instants in time. As an example, user 'A' 702 may access a particular system 756 to download a customer list at 3:47 PM on Nov. 3, 2017. Analysis of their user behavior profile indicates that it is not unusual for user 'A' 602 to download the customer list on a weekly basis.

However, examination of their user behavior profile also indicates that user 'A' 702 forwarded the downloaded customer list in an email message to user 'B' 772 at 3:49 PM that same day. Furthermore, there is no record in their user behavior profile that user 'A' 702 has ever communicated with user 'B' 772 in the past. Moreover, it may be determined that user 'B' 772 is employed by a competitor. Accordingly, the correlation of user 'A' 702 downloading the customer list at one point in time, and then forwarding the customer list to user 'B' 772 at a second point in time shortly thereafter, is an example of societal time.

In a variation of the prior example, user 'A' 702 may download the customer list at 3:47 PM on Nov. 3, 2017. However, instead of immediately forwarding the customer list to user 'B' 772, user 'A' 702 leaves for a two week vacation. Upon their return, they forward the previously-downloaded customer list to user 'B' 772 at 9:14 AM on Nov. 20, 2017. From an ontological time perspective, it has been two weeks since user 'A' 702 accessed the system 756 to download the customer list. However, from a societal time perspective, they have still forwarded the customer list to user 'B' 772, despite two weeks having elapsed since the customer list was originally downloaded.

Accordingly, the correlation of user 'A' 702 downloading the customer list at one point in time, and then forwarding the customer list to user 'B' 772 at a much later point in time, is another example of societal time. More particularly, it may be inferred that the intent of user 'A' 702 did not change during the two weeks they were on vacation. Furthermore, user 'A' 702 may have attempted to mask an intended malicious act by letting some period of time elapse between the time they originally downloaded the customer list and when they eventually forwarded it to user 'B' 772. From the foregoing, those of skill in the art will recognize that the use of societal time may be advantageous in determining whether a particular user behavior is acceptable, anomalous, abnormal, unexpected or malicious.

As used herein, mindset factors 726 broadly refer to information used to determine the mental state of a user at a particular point in time, during the occurrence of an event, an enactment of a user behavior, or combination thereof. As used herein, mental state broadly refers to a hypothetical state corresponding to the way a user may be thinking or feeling. In certain embodiments, the user mindset factors 726 may include a personality type. Examples of known approaches for determining a personality type include Jungian types, Myers-Briggs type indicators, Keirsy Temperament Sorter, Socionics, Enneagram of Personality, and Eyseneck's three-factor model.

In certain embodiments, the mindset factors 726 may include various behavioral biometrics. As likewise used herein, a behavioral biometric broadly refers to a physiological indication of a user's mental state. Examples of behavioral biometrics may include a user's blood pressure, heart rate, respiratory rate, eye movements and iris dilation, facial expressions, body language, tone and pitch of voice, speech patterns, and so forth.

In certain embodiments, the security analytics system 118 may be implemented to process certain entity information associated with providing resolution of the identity of an entity at a particular point in time. As likewise used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain entity identifier types or classifications.

In various embodiments, the security analytics system 118 may be implemented to use certain entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors 704, user profile attributes 712, location data 736, information associated with various endpoint 404 and edge 302 devices, internal 744 and external 746 networks, resource entities 750, or a combination thereof.

In certain embodiments, the entity identifier information may include temporal information. As used herein, temporal information broadly refers to a measure of time (e.g., a date, timestamp, etc.), a measure of a duration of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device 404, accessing a system 756, interacting with a physical security device 754 or shared devices 758, and entering a physical facility 752. Other examples of temporal events include uploading, transferring, downloading, modifying, or deleting data, such as data stored in a datastore 760, or accessing a service 762. Yet other examples of temporal events include user/user 770 interactions between two or more users, such as user 'A' 702 and user 'B' 772, user/device 730 interactions between a user and a device, user/network 742 interactions between a user and a network, and user/resource 748 interactions between a user and a resource 750, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the security analytics system 118 may be implemented to use information associated with such temporal resolution of an entity's identity to assess the risk associated with a particular entity, at a particular point in time, and adaptively respond with an associated response. In certain embodiments, the security analytics system 118 may be implemented to respond to such assessments in order to reduce operational overhead and improve system efficiency while maintaining security integrity. In certain embodiments, the response to such assessments may be performed by a security administrator 768. Accordingly, certain embodiments of the invention may be directed towards assessing the risk associated with the affirmative resolution of the identity of an entity at a particular point in time in combination with its associated contextual information. Consequently, the security analytics system 118 may be more oriented in various embodiments to risk adaptation than to security administration.

In certain embodiments, the security analytics system 118 may be implemented to use information associated with certain user behavior elements to resolve the identity of an entity at a particular point in time. A user behavior element, as used herein, broadly refers to a discrete element of a user's behavior during the performance of a particular operation in a physical realm, cyberspace, or a combination thereof. In certain embodiments, such user behavior elements may be associated with a user/device 730 interaction, a user/network 742 interaction, a user/resource 748 interaction, a user/user 760 interaction, or a combination thereof.

As an example, user 'A' 702 may use an endpoint device 404 to browse a particular web page on a news site on the Internet. In this example, the individual actions performed by user 'A' 702 to access the web page are user behavior elements that constitute a user behavior. As another example, user 'A' 702 may use an endpoint device 404 to download a data file from a particular system 656. In this example, the individual actions performed by user 'A' 702 to download the data file, including the use of one or more user authentication factors 704 for user authentication, are user behavior elements that constitute a user behavior. In certain embodiments, the user/device 730 interactions may include an interaction between a user, such as user 'A' 702 or 'B' 772, and an endpoint device 404.

In certain embodiments, the user/device 730 interaction may include interaction with an endpoint device 404 that is not connected to a network at the time the interaction occurs. As an example, user 'A' 702 or 'B' 772 may interact with an endpoint device 404 that is offline, using applications 732, accessing data 734, or a combination thereof, it may contain. Those user/device 730 interactions, or their result, may be stored on the endpoint device 404 and then be accessed or retrieved at a later time once the endpoint device 404 is connected to the internal 744 or external 746 networks. In certain embodiments, an endpoint agent 406 may be implemented to store the user/device 730 interactions when the endpoint device 404 is offline.

In certain embodiments, an endpoint device 404 may be implemented with a device camera 728. In certain embodiments, the device camera 728 may be integrated into the endpoint device. In certain embodiments, the device camera 728 may be implemented as a separate device configured to interoperate with the endpoint device 404. As an example, a webcam familiar to those of skill in the art may be implemented receive and communicate various image and audio signals to an endpoint device 404 via a Universal Serial Bus (USB) interface.

In certain embodiments, the device camera 728 may be implemented to capture provide user/device 730 interaction information to an endpoint agent 406. In various embodiments, the device camera 728 may be implemented to provide surveillance information related to certain user/device 630 or user/user 670 interactions. In certain embodiments, the surveillance information may be used by the security analytics system 118 to detect anomalous, abnormal, unexpected or malicious behavior associated with an entity, such as user 'A' 702 or user 'B' 772. In certain embodiments, the entity may or may not be aware that the camera is providing such surveillance information.

In certain embodiments, the endpoint device 404 may be used to communicate data through the use of an internal network 744, an external network 746, or a combination thereof. In certain embodiments, the internal 744 and the external 746 networks may include a public network, such as the Internet, a physical private network, a virtual private network (VPN), or any combination thereof. In certain embodiments, the internal 744 and external 646 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G, LTE technologies.

In certain embodiments, the user/user 770 interactions may include interactions between two or more users, such as user 'A' 602 and 'B' 662. In certain embodiments, the user/user interactions 770 may be physical, such as a face-to-face meeting, via a user/device 730 interaction, a user/network 742 interaction, a user/resource 748 interaction, or some combination thereof. In certain embodiments, the user/user 770 interaction may include a face-to-face verbal exchange. In certain embodiments, the user/user 770 interaction may include a written exchange, such as text written on a sheet of paper. In certain embodiments, the user/user 770 interaction may include a face-to-face exchange of gestures, such as a sign language exchange.

In certain embodiments, temporal event information associated with various user/device 730, user/network 742, user/resource 748, or user/user 770 interactions may be collected and used to provide real-time resolution of the identity of an entity at a particular point in time. Those of skill in the art will recognize that many such examples of user/device 730, user/network 742, user/resource 748, and user/user 760 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint 404 or edge 302 device, a physical security device 754, a system 756, a shared device 758, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 404 to access and browse a particular website on the Internet. In this example, the individual actions performed by the user to access and browse the website constitute a cyber behavior. As another example, a user may use an endpoint device 404 to download a data file from a particular system 756 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 736. In certain embodiments, the endpoint device 404 may be configured to receive such location data 736, which is used as a data source for determining the user's location 722. In certain embodiments, the location data 736 may include Global Positioning System (GPS) data provided by a GPS satellite 738. In certain embodiments, the location data 636 may include location data 736 provided by a wireless network, such as from a cellular network tower 740. In certain embodiments (not shown), the location data 736 may include various Internet Protocol (IP) or other network address information assigned to the endpoint 404 or edge 302 device. In certain embodiments (also not shown), the location data 736 may include recognizable structures or physical addresses within a digital image or video recording.

In certain embodiments, the endpoint devices 404 may include an input device (not shown), such as a keypad, magnetic card reader, token interface, biometric sensor, and so forth. In certain embodiments, such endpoint devices 404 may be directly, or indirectly, connected to a particular facility 752, physical security device 754, system 756, or shared device 758. As an example, the endpoint device 404 may be directly connected to an ingress/egress system, such as an electronic lock on a door or an access gate of a parking garage. As another example, the endpoint device 404 may be indirectly connected to a physical security device 754 through a dedicated security network.

In certain embodiments, the security analytics system 118 may be implemented to perform various risk-adaptive protection operations. Risk-adaptive, as used herein, broadly refers to adaptively responding to a risk associated with an electronically-observable user behavior. In various embodiments, the security analytics system 118 may be implemented to perform certain risk-adaptive protection operations by monitoring certain user behaviors, assess the corresponding risk they may represent, individually or in combination, and respond with an associated response. In certain embodiments, such responses may be based upon contextual information, described in greater detail herein, associated with a given user behavior.

In certain embodiments, various risk-adaptive behavior factors 774, likewise described in greater detail herein, may be used to perform the risk-adaptive protection operations. In certain embodiments, the risk-adaptive behavior factors 774 may include user profile attributes 712, user behavior factors 714, user mindset factors 726, or a combination thereof. In these embodiments, the risk-adaptive behavior factors 774 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 664. In certain embodiments, the security analytics service 764 may be implemented in a cloud environment familiar to those of skill in the art. In various embodiments, the security analytics system 118 may use data stored in a repository of security analytics data 780 in the performance of certain security analytics operations, described in greater detail herein. Those of skill in the art will recognize that many such embodiments are possible. Accordingly, the foregoing is not intended to limit the spirit, scope or intent of the invention.

Figure 8:
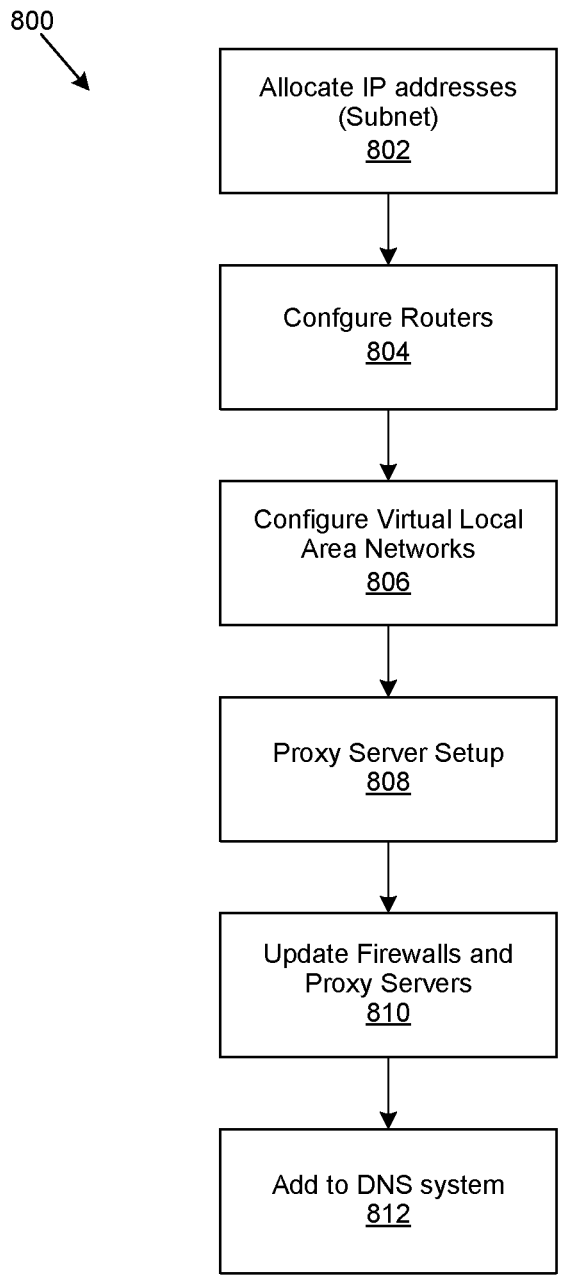
FIG. 8 is a generalized flowchart of deploying a virtual point of presence (VPoP) in a country or locale.

FIG. 8 is a generalized flowchart of deploying a virtual point of presence (VPoP) in a country or locale. In various embodiments, the information handling system 100 is implemented. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 802, allocation of IP addresses, and in particular subnet addresses such as /24, is performed. Allocation can include registering in a regional Internet registry (RIR) and/or with an Internet routing registry, such as RADb. At step 804, routers are configured. In particular, a determination is performed as to physical clusters or data center that a VPoP will run on. The IP addresses or subnet addresses (e.g., /24) are announced to transits and peers. At step 806, virtual local area networks (VLAN) are configured, which can include adding VLANs to switches. At step 808, proxy servers are setup. In particular, a software configuration management tool, such as "Puppet" software can be implemented. Firewall configurations are created, and virtual clusters and the VPoP are added to particular modules. A virtual cluster to a parent cluster through a configuration file, such as a 'yaml" file. At step 810, the firewalls and proxy servers are updated. Once the software configuration management tool completes all changes, the software configuration management tool is run on the firewalls and the VPoP is started. The VPoP can monitor the firewalls. The proxy can be updated by running the software configuration management tool and restarting the network. At, step 812, the VPoP is added to a domain name service (DNS) system, such as GeoDNS, such that that inbound traffic to the new/added clusters can be controlled the same way as current clusters.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for establishing a virtual point of presence (VPoP) in a locale comprising:
   registering an internet protocol (IP) prefix range for communication specific to the locale in a physical data center;
   implementing proxy servers on the data center that support the IP prefix range;
   geolocating users in the locale to the IP prefix range;
   network address translating inbound connections to the IP prefix range with IP addresses on the proxy servers to provide extended IP network addresses; and
   providing content to the users by the proxy servers on using the extended IP network addresses.

2. The method of claim 1, wherein the internet protocol (IP) prefix range is a/24 subnet.

3. The method of claim 1, wherein the proxy servers are implemented in a virtual cluster of servers.

4. The method of claim 1, wherein the proxy servers tag proxy and web connections by providing predefined Differentiated Services Code Point (DSCP) headers that are used by a firewall or NAT device to select an outgoing IP range.

5. The method of claim 1 further comprising providing virtual local area networks that provide the content to the users.

6. The method of claim 4 further comprising providing virtual local area networks that provide the content to the users.

7. The method of claim 1, wherein a physical router is located in the locale to provide content to the users.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      registering an internet protocol (IP) prefix range for communication specific to the locale in a physical data center;
      implementing proxy servers on the data center that support the IP prefix range;
      geolocating users in the locale to the IP prefix range;
      network address translating inbound connections to the IP prefix range with IP addresses on the proxy servers to provide extended IP network addresses; and
      providing content to the users by the proxy servers on using the extended IP network addresses.

9. The system of claim 8, wherein the registering is in a regional Internet registry (RIR) or with an Internet routing registry.

10. The system of claim 8, wherein the proxy servers are implemented as a virtual cluster of servers.

11. The system of claim 8, wherein the proxy servers tag proxy and web connections by providing predefined Differentiated Services Code Point (DSCP) headers that are used by a firewall or NAT device to select an outgoing IP range.

12. The system of claim 8 further comprising providing virtual local area networks that provide the content to the users.

13. The system of claim 11 further comprising providing virtual local area networks that provide the content to the users.

14. A non-transitory, computer-readable storage medium embodying computer program code, the computer program code comprising computer executable instructions configured for:
   registering an internet protocol (IP) prefix range for communication specific to the locale in a physical data center;
   implementing proxy servers on the data center that support the IP prefix range;
   geolocating users in the locale to the IP prefix range;
   network address translating inbound connections to the IP prefix range with IP addresses on the proxy servers to provide extended IP network addresses; and
   providing content to the users by the proxy servers on using the extended IP network addresses.

15. The non-transitory, computer-readable storage medium of claim 14, wherein the registering is in a regional Internet registry (RIR) or with an Internet routing registry.

16. The non-transitory, computer-readable storage medium of claim 14, wherein the proxy servers proxy servers tag proxy and web connections by providing predefined Differentiated Services Code Point (DSCP) headers that are used by a firewall or NAT device to select an outgoing IP range.

17. The non-transitory, computer-readable storage medium of claim 14 further comprising providing virtual local area networks that provide the content to the users.

18. The non-transitory, computer-readable storage medium of claim 16 further comprising providing virtual local area networks that provide the content to the users.

19. The non-transitory, computer-readable storage medium of claim 14, wherein the computer executable instructions are deployable to a client system from a server system at a remote location.

20. The non-transitory, computer-readable storage medium of claim 14, wherein the computer executable instructions are provided by a service provider to a user on an on-demand basis.

* * * * *